July 23, 1968    H. A. SAUER    3,393,729
HEAT EXCHANGE MANTLE WITH INTERCHANGEABLE CARTRIDGE MEANS
Filed Aug. 1, 1966    4 Sheets-Sheet 1
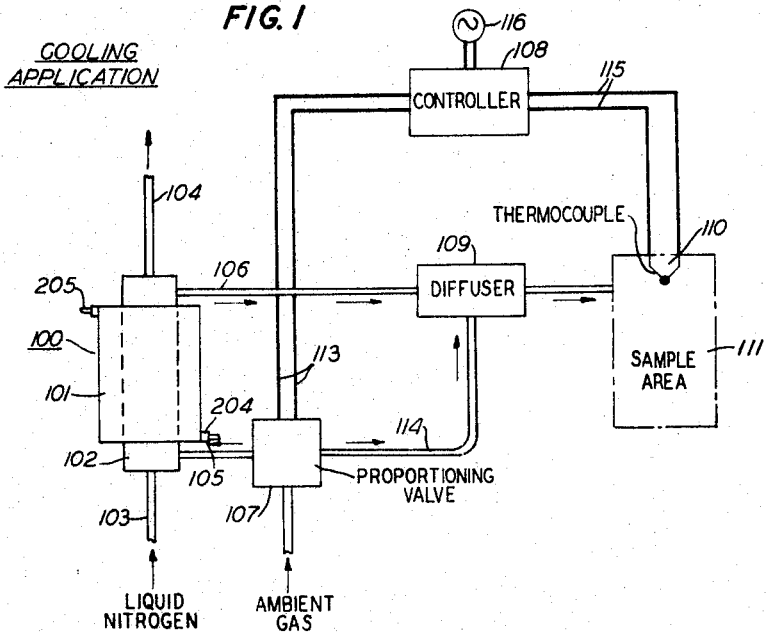
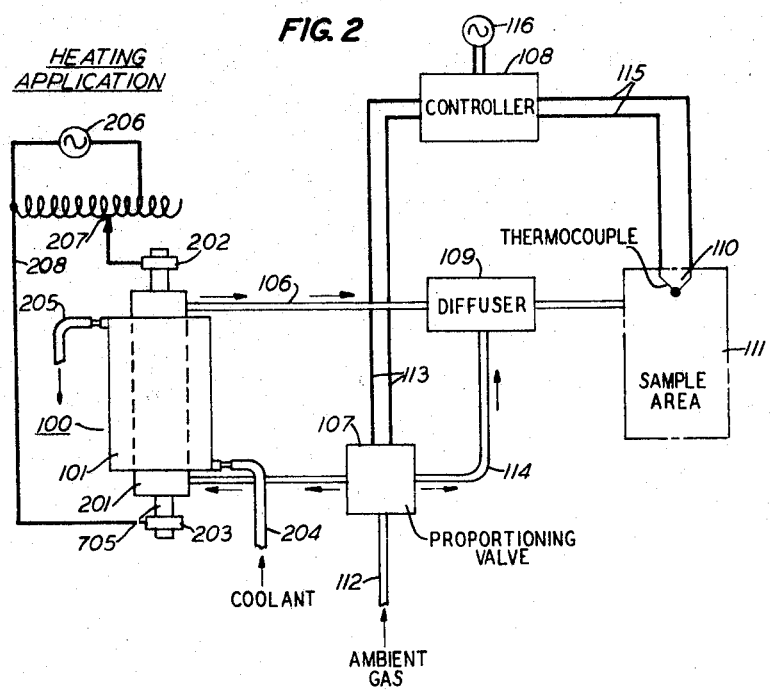
INVENTOR
H. A. SAUER
BY E. J. Ohnider
ATTORNEY July 23, 1968 H. A. SAUER 3,393,729
HEAT EXCHANGE MANTLE WITH INTERCHANGEABLE CARTRIDGE MEANS
Filed Aug. 1, 1966 4 Sheets-Sheet 2

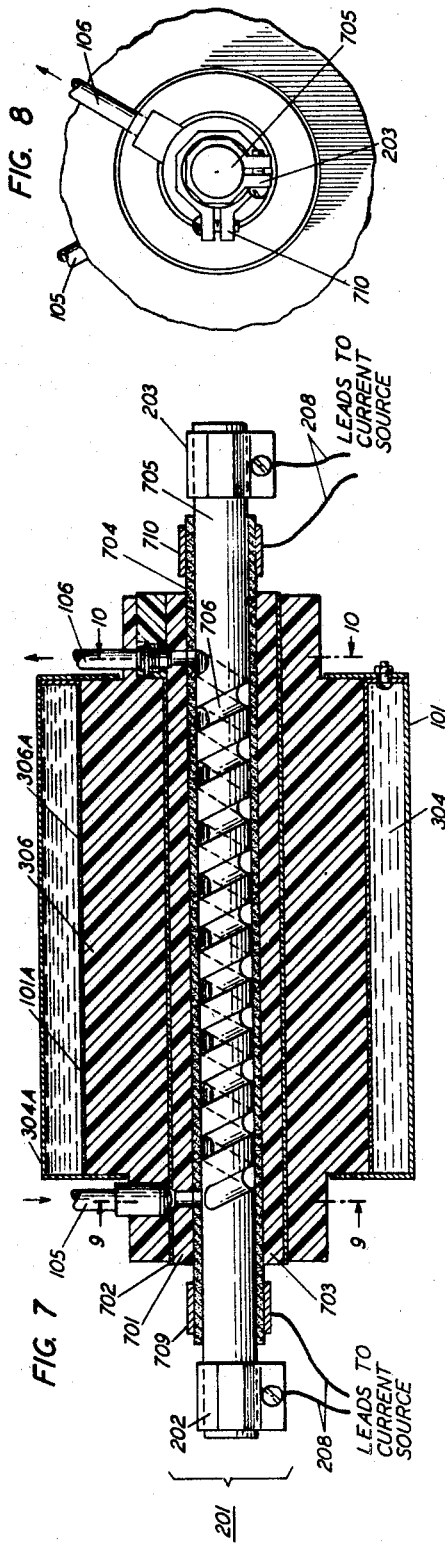

United States Patent Office 3,393,729
Patented July 23, 1968

3,393,729
HEAT EXCHANGE MANTLE WITH INTER-
CHANGEABLE CARTRIDGE MEANS
Harold A. Sauer, Hatboro, Pa., assignor to Bell Telephone
Laboratories, Incorporated, Berkeley Heights, N.J., a
corporation of New York
Filed Aug. 1, 1966, Ser. No. 569,506
6 Claims. (Cl. 165—61)

ABSTRACT OF THE DISCLOSURE

A heat exchanger usable alternatively to heat or to cool a gaseous medium includes a single heat exchanger mantle with a cavity therein together with heating cartridge means and cooling cartridge means, the two cartridge means being interchangeably insertable in the cavity of the mantle.

---

This invention relates to heat exchangers and more particularly to compound heat exchangers for gaseous heat carriers.

The increasingly widespread utilization of heating and cooling sources in modern industrial plants and laboratories has created a growing demand for more efficient heat exchangers and for heat exchangers that are subject to precise control over extremely wide ranges of temperature. Temperature control systems and heat exchangers of the type indicated find use in particular in the heating and cooling of specimens associated with instrumentation work employing, for example, spectrophotometers, microscopes, high frequency dielectric measurement apparatus, thermal diffusivity, specific heat facilities, and X-ray equipment. Additionally, convenient and closely controllable cooling sources are required for laboratory work with cryogenic apparatus.

Heat exchangers known heretofore are typically designed specifically for either heating or cooling. The two functions are generally considered completely separate and distinct, particularly at extreme temperature levels and, accordingly, it is common practice to employ one type of heat exchanger for heating and a substantially different type of heat exchanger for cooling. One form of exception to this general practice lies in an arrangement that utilizes a single insulated container for housing both a heating and a cooling type heat exchanger, which, in turn, are also, of course, insulatedly separated from each other. Such a system is shown, for example, by R. Sardeson in United States Patent No. 2,690,327, issued Sept. 28, 1954. In a particular type of limited-function installation such an arrangement may indeed have certain advantages; in general, however, heat exchanger efficiency, simplicity and portability are all sacrificed. Consequently, as an approach to the goal of providing highly convenient dual function heat exchanger equipment, such arrangements fall far short of ideal, particularly in view of the lack of portability and general inconvenience necessarily associated with equipment that includes two complete heat exchangers.

Accordingly, one object of the invention is to simplify heat exchanger equipment that may be utilized for both high level heating and low level cooling.

Another object is to increase the portability aspects of heat exchanger equipment.

A further object is to enhance the versatility of heat exchangers with respect to the range of temperatures that may be encompassed.

These and other objects are achieved in accordance with the principles of the invention in a heat exchanger structure that employs a basic insulated mantle or housing with an internal cavity uniquely adapted to accommodate either of a pair of cartridge-like heat exchanger cores. These cores, or cartridges, are specifically designed for a gaseous medium, that is to say, the substance to be cooled or heated is gaseous. In accordance with one aspect of the invention each of the two cartridges is constructed in a closely similar fashion although one is specifically adapted as a heating element and one is specifically adapted as a cooling element.

One of the features of the invention involves the employment of a form of convoluted rod as the heat control element in both the heating cartridge and in the cooling cartridge. In the heating cartridge the rod is preferably constructed of a solid refractory type material provided with terminals for the connection of heating current electrodes. In the cooling cartridge the rod is advantageously hollow, is constructed of a thin, highly heat-conductive material and is provided with a port at each end to permit the passage of a coolant therethrough such as liquid nitrogen, for example. The mantle is provided with entrance and exit ports for the gaseous medium that register with corresponding ports on the installed cartridge member.

The principles of the invention together with additional objects and features thereof will be fully apprehended from the following detailed description of an illustrative embodiment of the invention and from the drawing in which:

FIG. 1 is a block diagram of a compound heat exchanger in accordance with the invention illustrating its use as a cooler for a gaseous medium;

FIG. 2 is a block diagram of a compound heat exchanger in accordance with the invention illustrating its use as a heater for a gaseous medium;

FIG. 7 is a cross-section view of a heat exchanger in accordance with the invention with the heating cartridge installed;

FIG. 8 is an end view of the apparatus shown in FIG. 7;

FIG. 9 is a cross-section view of the apparatus shown in FIG. 7 taken along the line 9—9 in the direction of the small arrows; and FIG. 10 is a cross-section view of the apparatus shown in FIG. 7 taken along the line 10—10 in the direction of the small arrows.

Figure 3:
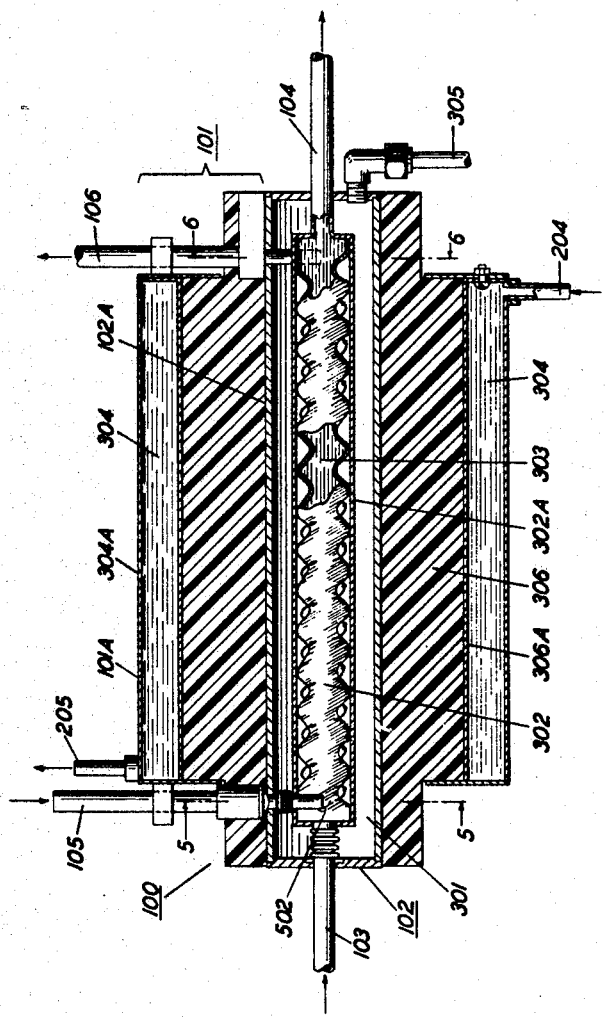
FIG. 3 is a cross section of a compound heat exchanger in accordance with the invention with the cooling heat exchanger cartridge installed.

FIGS. 1 and 2 are presented merely to illustrate the type of environment in which a compound heat exchanger in accordance with the invention is typically utilized. As shown in FIG. 1, illustrating the cooling application, the object to be cooled is placed in a sample area 111. A thermocouple 110 detects the temperature in the sample area 111 and applies a corresponding electrical signal over leads 115 to a controller 108. In response to the thermocouple signal, the controller 108 applies control current from a generator 116 by way of leads 113 to a proportioning valve 107. Ambient gas entering the proportioning valve 107 is directed through tube 114 to a diffuser 109 and to the heat exchanger 100 by way of a tube 105. The proportions of ambient gas applied in the manner indicated are determined by the proportioning valve 107 in accordance with the control current applied thereto. A suitable coolant such as liquid nitrogen, for example, is circulated through the heat exchanger 100 through tubes 103 and 104. In the cooling cartridge 102 heat is removed from the ambient gas and the cooled gas is directed to the diffuser 109 by way of a tube 106. The proportion of ambient gas and cooled gas introduced into the diffuser 109 determines the final temperature of the gas that is applied to the sample area 111.

In accordance with the invention, if the gaseous medium is to be heated rather than cooled, the cooling cartridge 102 shown in FIG. 1 is simply removed from the mantle 101 of the heat exchanger 100, and a replacement heating cartridge 201 is inserted into the mantle 101 as shown in FIG. 2. In FIG. 2 the heating element 705 of the heating cartridge 201 is connected by electrodes 202 and 203 to a current source 206, the output of which is controlled by a rheostat 207. Additionally, a coolant such as water is introduced into the water jacket of the mantle 101, circulating through the tubes 204 and 205. Aside from the heating cartridge 201, the electrical connections thereto and the use of a water jacket coolant, the general arrangement of the apparatus in FIG. 2 is substantially identical to the apparatus shown in FIG. 1.

Figure 4:
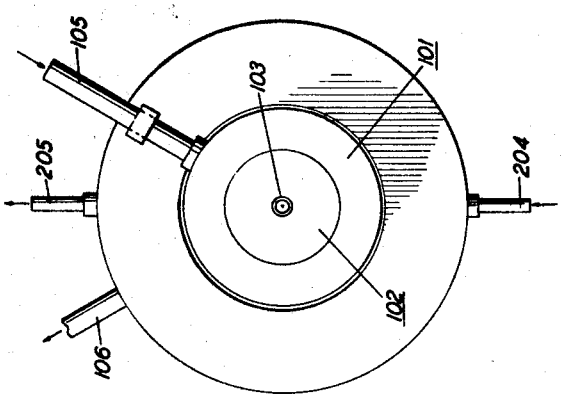
FIG. 4 is an end view of the arrangement shown in FIG. 3.
Figure 5:
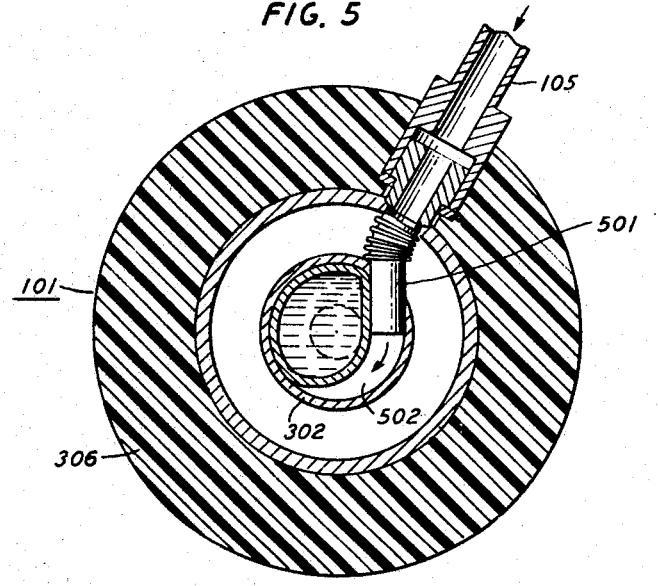
FIG. 5 is a cross-section view of the apparatus shown in FIG. 3 taken along the line 5—5 in the direction of the small arrows.

Details of a compound heat exchanger, in accordance with the invention, with the cooling cartridge installed therein are best illustrated by FIGS. 3 and 4. The heat exchanger mantle is formed from an outer metal cylinder 304A and an inner metal cylinder 101A that mark the boundaries of an outer water jacket 304. As indicated above, when the heat exchanger is employed as a heater, a coolant such as water is circulated through the jacket 304 by means of the tubes 204 and 205. If the heat exchanger is being used as a cooler, however, circulation of water in the jacket 304 is not required. The interior portion of the mantle 101 is formed from a thick, hollow cylindrical layer of a suitable insulating material 306 such as Fiberfrax, for example. The cooling cartridge 102 is inserted, as shown, in the center cavity or core of the mantle 101. The cartridge 102 includes an outer cylindrical casing member 102A and an inner cylindrical casing member 302A, with an airspace 301 therebetween. Most of the air in the space 301 is removed by way of the tube 305 in order to form a partial vacuum therein and thus inhibit the transfer of heat by convection. Inside the cylinder 302A is a thin walled convoluted tube member 302, which may be constructed of a material such as copper with high thermal conductivity. As shown in FIG. 5, ambient gas to be cooled is introduced through the tube 105 and its connecting nozzle 501 into the initial depression or opening 502 of the convoluted channel on the outer surface of the tube 302. As the gas spirals in turbulent motion around the outside of the tube 302 it gives up heat to the coolant flowing through the inside 303 (FIG. 3) of the tube 302.

Figure 6:
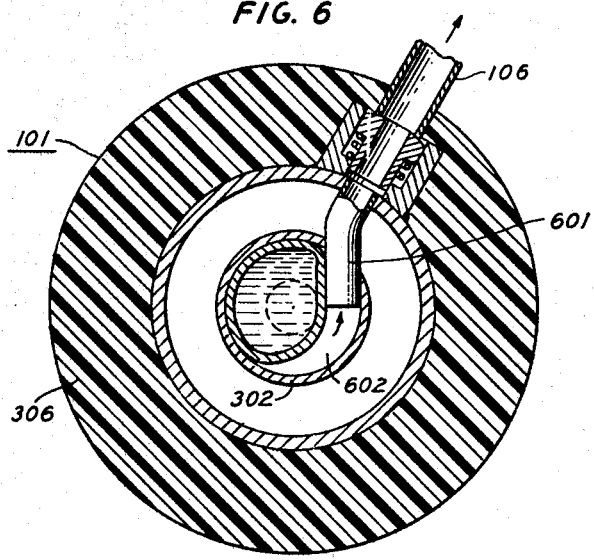
FIG. 6 is a cross-section view of the apparatus shown in FIG. 3 taken along the line 6—6 in the direction of the small arrows.

As shown in FIG. 6, the cooled gas is removed from the heat exchanger as it enters the termination of its convoluted path 602 entering the elbow 601 and the discharge tube 106.

As indicated above, a compound heat exchanger in accordance with the invention may readily be converted from a gas cooler to a gas heater simply by removing the cooling cartridge 102 from the mantle 101 and replacing it with the heating cartridge 201. To effect this conversion, neither the mantle 101 nor any of its appurtenances need be modified or altered in any way.

As shown in FIG. 7, the heating cartridge 201 is enclosed by a cylindrical casing 702 and a layer of insulation 701. The center core member or heating element 705 may advantageously be formed from a refractory material such as silicon carbide, for example, is typically solid, and is formed with a convoluted or spiral-like open trough or passageway 706 progressing along its outside surface. A sleeve of similar or identical refractory material 704 is between the insulating band 701 and the center core 705, forming an outer boundary for the spiral passageway 706. The center core member 705 is heated electrically by a current from a source 206, FIG. 2, which is applied to the electrodes 202 and 203 by leads 208. The enclosing refractory cylinder 704 is similarly heated through electrodes 709 and 710, so that the flowing gas receives heat from both the top and the underside of its accommodating passageway 706.

As shown in FIG. 9, gas to be heated is introduced by the tube 105 into the starting point 901 of the spiral passageway 706 and the heated gas is removed by the output tube 106, as shown in FIG. 10, when it reaches the termination 902 of the passageway 706.

It is to be understood that the embodiment described herein is merely illustrative of the principles of the invention. Various modifications thereto may be made by persons skilled in the art without departing from the spirit and scope of the invention.

What is claimed is:

1. Dual function combination heat exchanger apparatus comprising,
    a single insulated heat exchanger mantle having a cavity therein,
    dual function entrance port means for introducing a gaseous medium into said cavity for either heating or cooling,
    dual function exit port means for removing said gaseous medium from said cavity after either heating or cooling,
    first heat exchanger cartridge means insertable in said cavity in registry with said ports to effect heating of said gaseous medium,
    and second heat exchanger cartridge means insertable in said cavity in registry with said ports in lieu of said first cartridge to effect cooling of said gaseous medium,
    whereby the function of said heat exchanger may be shifted selectively between heating said gaseous medium and cooling said gaseous medium by the selective insertion of one of said cartridges into said mantle.

2. Apparatus in accordance with claim 1 wherein said first cartridge means comprises
    a substantially cylindrical member of refractory material having a convoluted surface forming a substantially spiral path for said gaseous medium
    and means for electrically heating said cylindrical member.

3. Apparatus in accordance with claim 1 wherein said second cartridge means comprises
    a hollow convoluted substantially cylindrical tube member forming a substantially spiral path for said gaseous medium
    and means for circulating a liquid coolant through said tube member.

4. Dual function combination heat exchanger apparatus comprising the combination of
    a single heat exchanger mantle having a cavity therein,
    means for introducing a gaseous medium into said cavity,
    means for removing said gaseous medium from said cavity,
    first heat exchanger cartridge means insertable in said cavity in registry with said introducing and removing means for heating said medium, and
    second heat exchanger cartridge means insertable in said cavity in registry with said introducing and removing means for cooling said medium,
    said first and second cartridge means being interchangeably insertable in said cavity,
    whereby the function of said heat exchanger may be shifted selectively between heating said gaseous medium and cooling said gaseous medium by the selective insertion of one of said cartridges into said cavity of said mantle.

5. Apparatus in accordance with claim 4 wherein said first cartridge means comprises a substantially cylindrical member of refractory material having a convoluted surface thereon, a sleeve member of refractory material fitted around said cylindrical member, said sleeve member and said convoluted surface together forming a substantially spiral passage for said gaseous medium between said introducing means and said removing means, and means for electrically heating said cylindrical member.

6. Apparatus in accordance with claim 4 wherein said second cartridge comprises a hollow, convoluted substantially cylindrical member of thermally conductive material, a substantially cylindrical first jacket member surrounding said convoluted member thereby to form a substantially spiral passage for said gaseous medium between said introducing means and said removing means, a second substantially cylindrical jacket member surrounding said first jacket member and spaced therefrom thereby to form an annular airspace therebetween, means for evacuating the air from said airspace, and means for circulating a liquid coolant through said convoluted member.

References Cited

UNITED STATES PATENTS

| | | | |
|---|---|---|---|
| 2,690,327 | 9/1954 | Sardeson | 165—64 XR |
| 2,721,729 | 10/1955 | Van Riper | 165—64 |
| 2,998,966 | 9/1961 | Knight | 165—120 XR |
| 3,074,695 | 1/1963 | Hold et al. | 165—64 XR |
| 3,129,459 | 4/1964 | Kullgren et al. | 18—12 |
| 3,200,878 | 8/1965 | Ainley et al. | 165—64 |
| 3,225,821 | 12/1965 | Sollich | 165—30 |

ROBERT A. O'LEARY, *Primary Examiner.*

M. A. ANTONAKAS, *Assistant Examiner.*